United States Patent
Gandhi

(10) Patent No.: US 11,464,353 B2
(45) Date of Patent: Oct. 11, 2022

(54) PRESSURE COOKER AUTOSPICE DISPENSER WITH OPTIONAL BLENDER DISPENSER

(71) Applicant: Swetal Gandhi, St Johns, FL (US)

(72) Inventor: Swetal Gandhi, St Johns, FL (US)

(*) Notice: Subject to any disclaimer, the term of this patent is extended or adjusted under 35 U.S.C. 154(b) by 142 days.

(21) Appl. No.: 17/155,401

(22) Filed: Jan. 22, 2021

(65) Prior Publication Data

US 2022/0233012 A1    Jul. 28, 2022

(51) Int. Cl.
*A47J 27/08* (2006.01)
*A47J 47/01* (2006.01)
*A47J 43/07* (2006.01)
*A47J 43/044* (2006.01)

(52) U.S. Cl.
CPC ....... *A47J 27/0802* (2013.01); *A47J 27/0815* (2013.01); *A47J 43/044* (2013.01); *A47J 43/0711* (2013.01); *A47J 47/01* (2013.01)

(58) Field of Classification Search
CPC .............. A47J 43/0711; A47J 27/0815; A47J 27/0802; A47J 47/01; A47J 43/044; A47J 36/321
USPC ......... 99/327, 332, 334, 337, 339, 348, 353, 99/372, 376; 219/395, 399, 403, 429, 219/438, 432, 433, 436, 442, 472, 474, 219/524, 525, 521
See application file for complete search history.

(56) References Cited

U.S. PATENT DOCUMENTS

| | | | |
|---|---|---|---|
| 3,132,849 | A | 5/1964 | Kritiksen |
| 3,364,845 | A | 1/1968 | Wilson |
| 4,397,879 | A | 8/1983 | Wilson |
| 2,296,849 | A | 1/1996 | Harrison |
| 5,549,038 | A | 8/1996 | Kolvites |
| 6,705,209 | B2 | 3/2004 | Yang |
| 2,991,584 | A1 | 5/2016 | Leonards |
| 2014/0377417 | A1* | 12/2014 | Martinez ............. A47J 27/0802 99/334 |
| 2016/0067866 | A1 | 3/2016 | Sekar |

* cited by examiner

*Primary Examiner* — Phuong T Nguyen
(74) *Attorney, Agent, or Firm* — Lawrence J. Gibney, Jr.

(57) ABSTRACT

This device will allow an individual to store and cook food by pre-programming the pressure cooker for that purpose. Additionally, additional spices may be used depending on specific recipes, and a blender or chopper may also be required if it is required by the recipe. The operation of this device may also be controlled remotely.

5 Claims, 5 Drawing Sheets

PRESSURE COOKER AUTOSPICE DISPENSER WITH OPTIONAL BLENDER DISPENSER

A. FIELD OF THE INVENTION

The use of a slow no pressure cooker is handy for people to cook meals over a long period of time; this type of cooker is not a pressure vessel. The ingredients are placed in the slow cooker and the slow cooker is turned to a temperature setting. The food will cook while the person is attending to other matters. Some slow cookers are also programmable for the convenience of the user.

This device is not a slow cooker, but it is device that uses pressure during the cooking process. A common name for a low pressure cooking vessel is the Instapot. This device improves upon the functions of a cooking vessel that uses pressure. Recipes are used with slow cookers or pressure vessels that dictate the addition of spices or seasoning are added at designated times.

The current device allows the spices or other ingredients to be added at the appropriate time and in the appropriate quantity without the intervention of the user. This allows the device to operate completely hands free. Additionally, a blender or chopper is also included to accommodate those recipes that may require blended or chopped ingredients.

It is anticipated that a person will be able to manually perform the functions of the addition of spices and other ingredients as well as perform them using wireless technology.

B. PRIOR ART

There are other prior art preferences to cooking device both slow and fast cooking devices.

A representative example of the type of art that is found can be found Sekar, U.S. Patent Publication 2016/0067866. This application is an automatic cooking machine using a robot. The cooking machine will dispense, stir, cook, bake and clean using this robot system. In this current application, this is not a robotic system, although both are automated.

Another representative example of the prior art can be found at Yang, U.S. Pat. No. 6,705,209, which is a pressure cooker with a cooking pot and removable lid; however, the Yang device does not have the ability to add ingredients and does not teach an automatic cooking system.

Another example of the prior art can be found at Martinez, U.S. Patent Publication 2014/0377417. Martinez references an automated cooking system which will dispense at least one ingredient and agitate the one ingredient and cook at least one ingredient. The processor, which is part of the application, regulates the cooking parameters such as duration, temperature, and order of ingredients.

This device also incorporates the use of WIFI reception and USB port to receive new recipes and other cooking related commands.

BRIEF SUMMARY OF THE INVENTION

Many people use crockpots or slow no-pressure cookers, which are vessels that use no pressure to cook food. The slow cooker allows food to be cooked slowly and usually has a few temperature settings. Slow cookers do not use pressure while cooking and the slow cooker is designed to cook food slowly. If a person wishes to add ingredients to a recipe while using a slow cooker, the person must remember to add the items and manually add them at the appropriate time.

A pressure vessel such as an Instapot, which is not a slow cooker, is a variation of a food cooker that uses pressure (unlike the crockpot) during the cooking process. The pressure allows the food to be cooked quicker than the typical slow cooker. Pressure cookers allow the person to add food items and spices during the cooking process like the slow pressure and they also have temperature and timer settings.

The current application improves upon the pressure cooker by allowing the person to add ingredients to a recipe during the cooking process automatically. This is achieved by storing spices or vegetables (for example) in containers for that purpose on the top lid of the device. The individual can time the addition of spices to be added based on a set schedule that will be determined by the recipe. A blender or chopper will be incorporated to blend or chop vegetables prior to the item being added to the pressure cooker if needed.

The device will allow a person to preprogram recipes as well as the timing of the additional material to be added to the recipe.

NUMBERING DESCRIPTION

1—Device
2—Outer Shell
3—Interlocking Lid Edge
4—Footing
5—Handle
10—Lid
15—Removable Spice Holder
16—Opening for Spice Holders
16P—Removable Plug
17—Cover
18—Hinge Pin
19—Motor
20—Blender or Chopper
25—Vent
30—Digital Control Panel
31—Lid Digital Control Panel
35—Electrical Connection Port
40—Power Cord
45—Inner Shell
55—Cap for Opening for Blender or Chopper
60—Opening for Blender or Chopper
65—Blender Twist Lock Slot

DETAILED DESCRIPTION OF THE EMBODIMENTS

This device 1 will operate as a pressure cooker for the preparation of food. A crockpot usually cooks food over a long period of time and has few temperature settings; a crockpot does not use pressure during the cooking process. A pressure cooker such as an Instapot uses pressure to cook food.

A pressure-cooking vessel is a cooking vessel that cooks food using a low pressure and will cook food faster than the traditional slow cooker. A crockpot is mentioned to illustrate the differences in cooking methods between the two devices; the current device is specifically discussing modifications to a cooking vessel that uses pressure such as an Instapot.

Typically, a person inserts food to be cooked into the slow cooking vessel, selects the appropriate temperature setting and the appropriate time and walks away for a long period of time. The person must remember to add ingredients if ingredients are added to the recipe. During a person's absence, the food will cook, typically slowly. The timing to cook a particular food is based on the food itself as well as the preferences of the individual.

Figure 1:
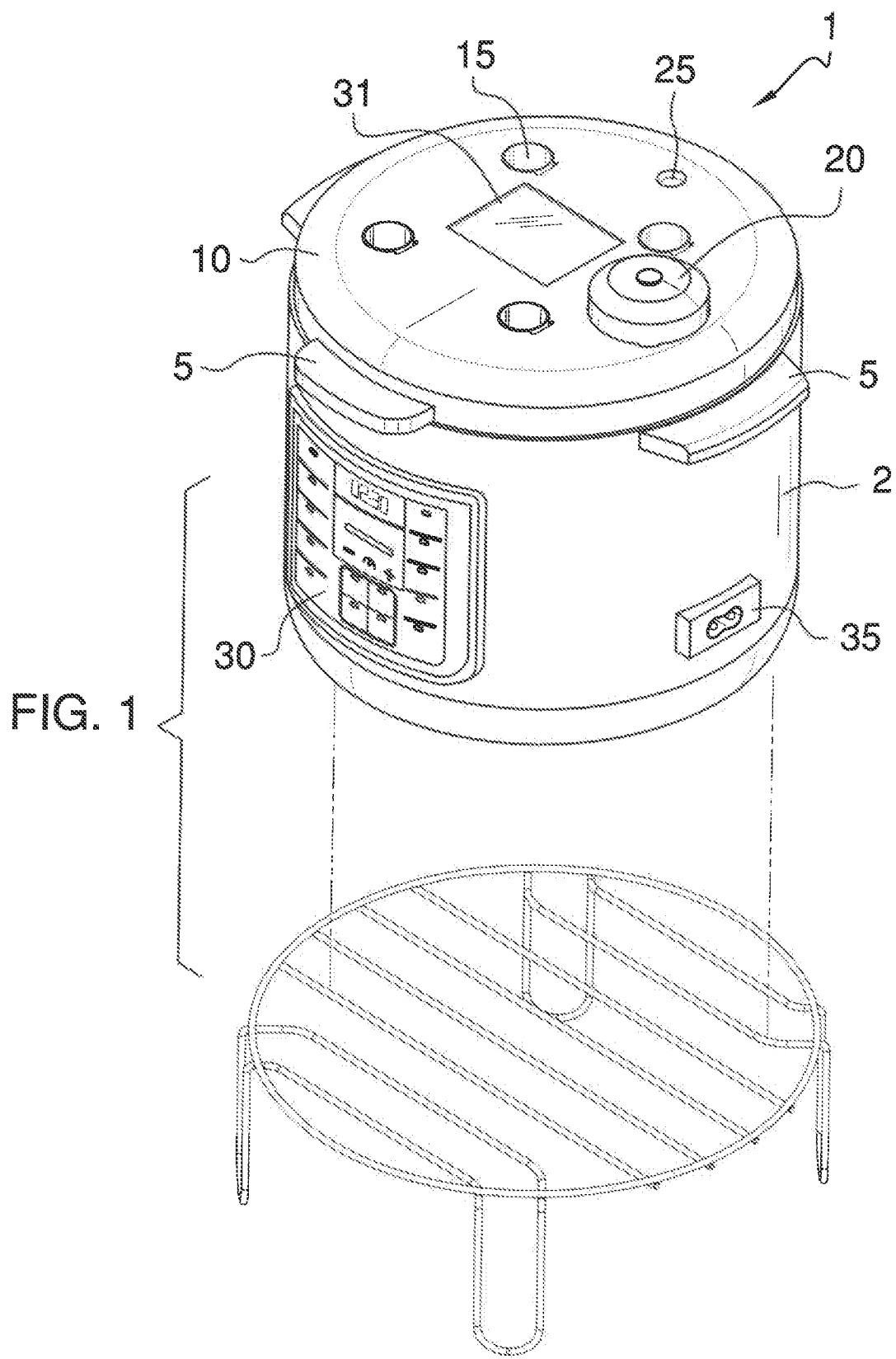
FIG. 1 is a perspective view of the device.

This current device is a portable pressure-cooking device that uses low pressure. The device 1 is designed to be portable and may rest upon a stand such as depicted in FIG. 1. The portable cooking device will have an outer shell 2 and an inner shell 45 in which the food is placed prior to cooking.

Figure 3:
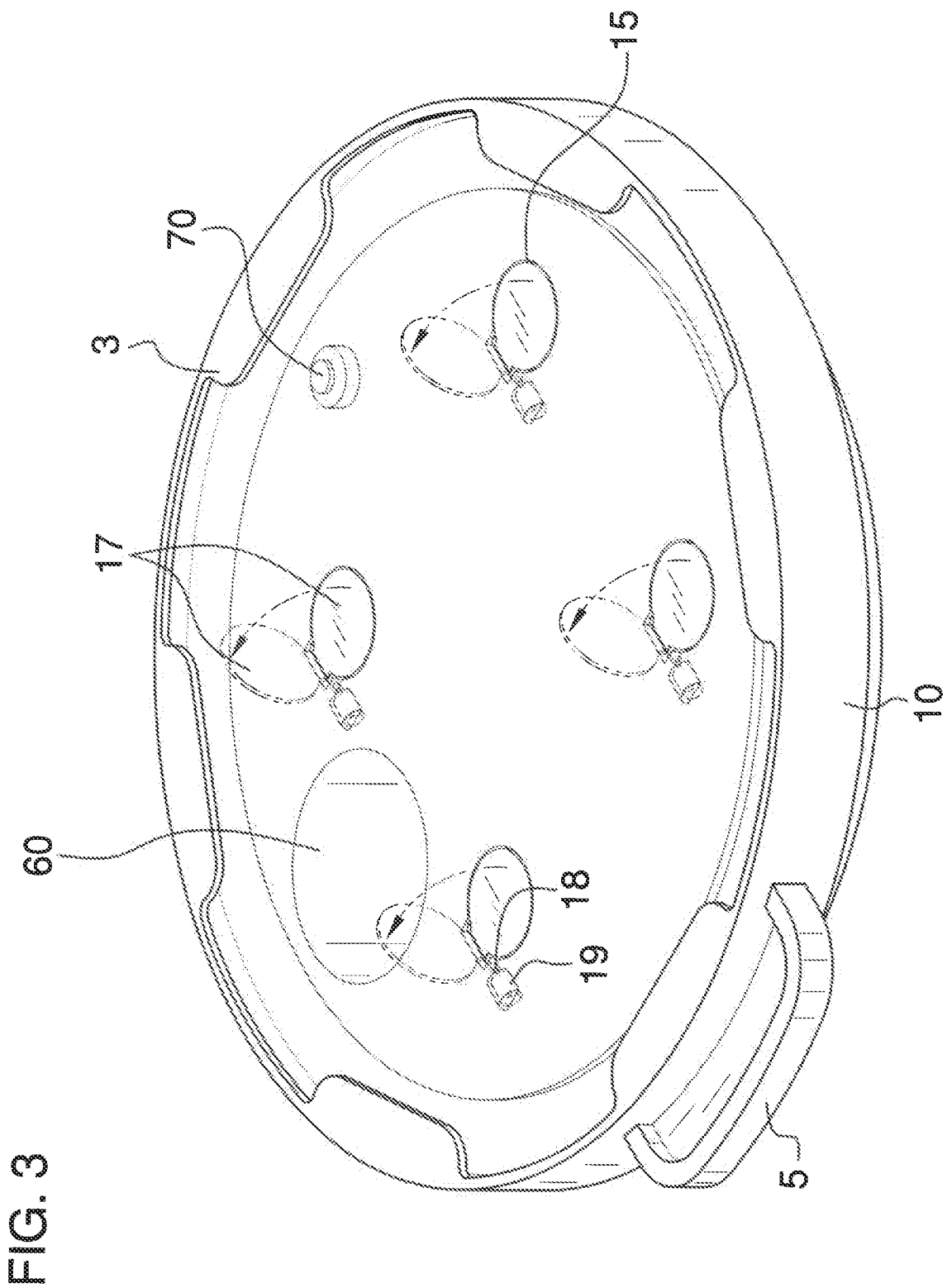
FIG. 3 is a bottom perspective view.
Figure 4:
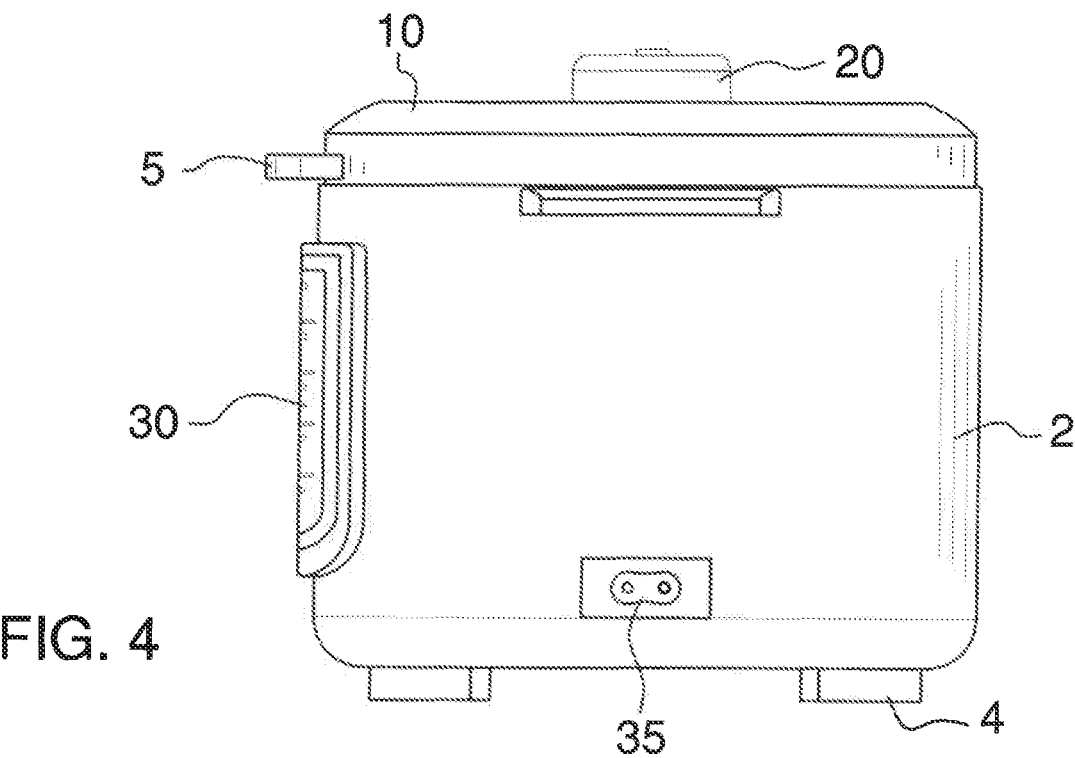
FIG. 4 is a side view.
Figure 5:
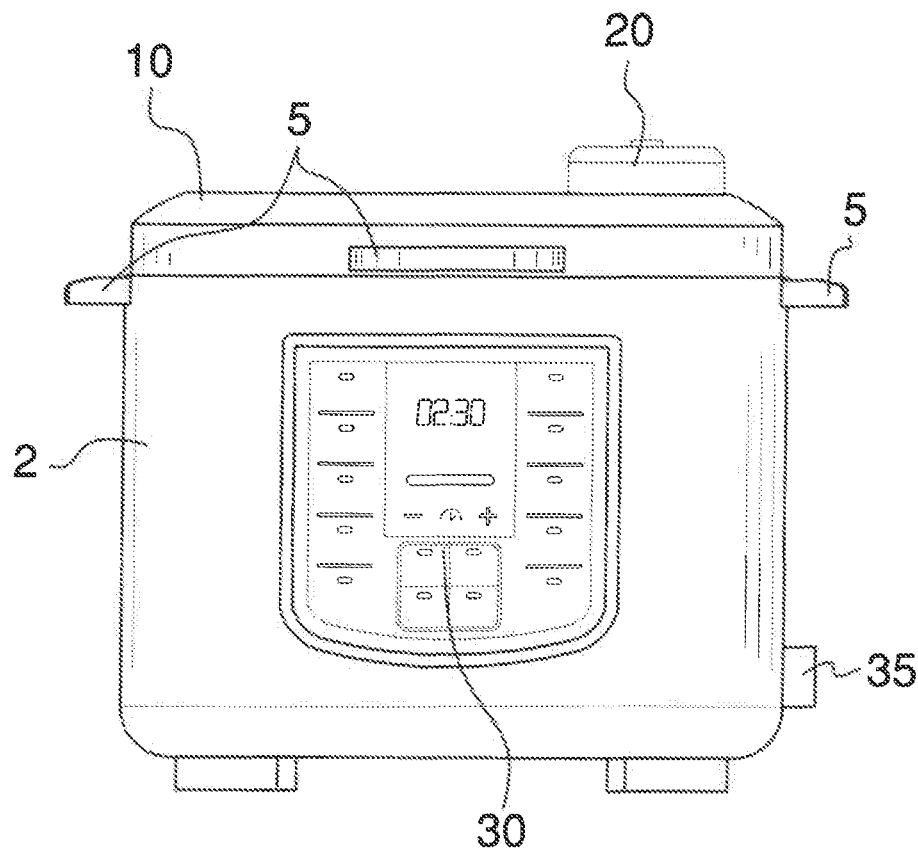
FIG. 5 is a front view.
Figure 6:
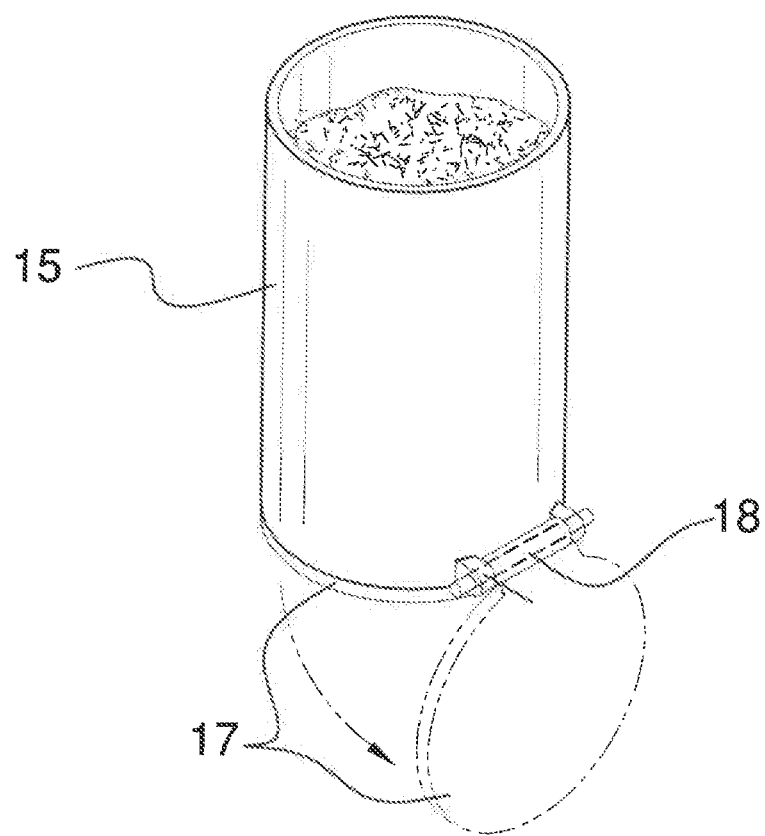
FIG. 6 is a detailed view of the spice holder.

This device 1 allows the addition of spices or other ingredients such as vegetables at predetermined times depending on a specific recipe; the addition of spices and vegetable is controlled by the lid digital control panel 31. A predetermined amount of spice or other ingredient is placed within a plurality of removable spice holders 15 that are on the top lid 10 of the device 1. At a predetermined time that is set on the lid digital control panel 31 the appropriate spice or vegetable holder bottom 17 opens and the spice or vegetable is added to the food that is being cooked. The removable spice holder is opened using a hinge pin 18 and motor 19 that rotates and opens the removable spice holder bottom 17 such as depicted in FIG. 3. At the appropriate time, the motor 19 engages and rotate the hinge pin 18 to allow the contents to empty into the pressure cooking vessel. The control panel on the lid 31 allows the user to program when ingredients are added.

Figure 2:
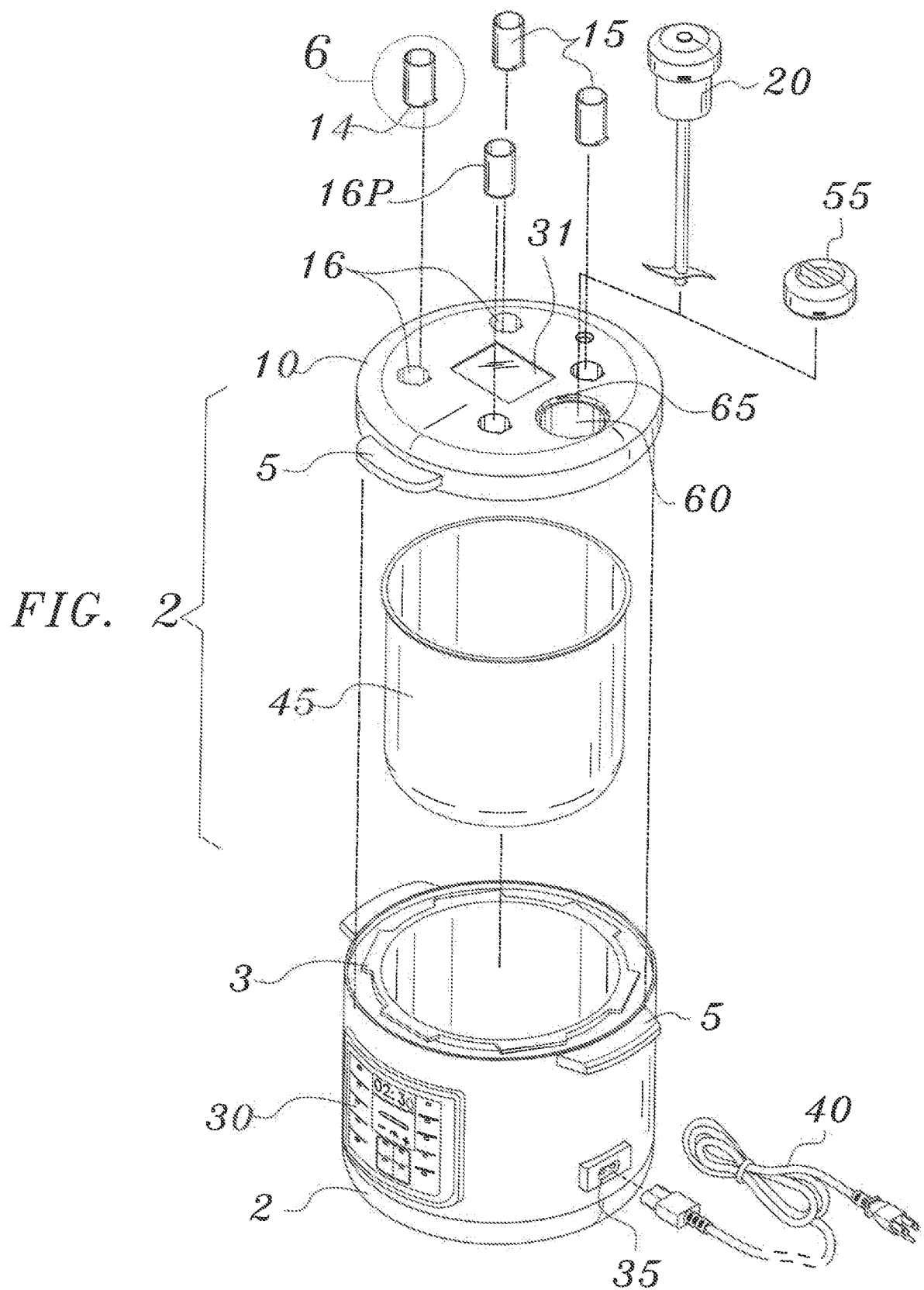
FIG. 2 is an exploded view of the device.

A plurality of plugs 16P is provided to cover the opening if the removable spice holder is removed and not needed. In FIG. 2 three removable spice holders 15 and one plug 16P are depicted; this is a representative number of spice holders and an individual may have more or less than three removable spice holders.

A blender or chopper 20 to grind up the food or spices so they may be added to the food is also provided. The blender or chopper 20 is positioned so that the vegetable can be chopped if necessary and then immediately added to the recipe. A plug or cap 55 for the orifice for the blender or chopper may be used to plug the opening 60 if the blender or chopper is not being used or is not necessary.

It is anticipated that this device will be operated using alternating current such as a standard outlet in a house.

A digital control panel 30 on the front as well as the digital control panel on the top of the lid 31 will allow a person to program the device so that it cooks the food that is within the device. The digital control panel 30 on the front allows the person to program the original recipe; the digital control panel on the top of the lid 31 allows a person to program the addition of spices and vegetables. The digital control panel will also allow the person to operate this device remotely using a smart phone and blue tooth technology.

The device 1 will look like a pressure cooker. A set of handles 5 will allow the individual to pick up and move this device if needed. An optional stand is also depicted in FIG. 1; the stand is not part of the device but can be used as an accessory.

On the front of the device will be a digital control panel 30 which will allow the individual to pre-program the recipe. Items that may be pre-programmed may include a temperature setting, timer setting to name a few. On top of the lid 10 will be a variety of removable spice holders 15. Different spices may be added to different holders depending on the recipe. Although four spice holders are depicted, this is simply a representative number.

Although spices are mentioned, the user may also add ingredients that will be helpful to a recipe as well as the items do not necessarily have to be spices. Examples of items that may be placed in the removable spice holders include diced tomatoes, chopped onions, and garlic to name a few of the items that may be added to the removable spice holder.

A vent 25 is provided to prevent the unintended buildup of pressure within the unit and to protect the unit in the event of excess pressure.

A blender or chopper 20 will be provided on the top surface of the lid to blend of chop items prior to addition to the unit. The blender or chopper will be placed in the opening of orifice for the blender or chopper 60. Within the opening of this orifice a twist lock slot 65 is provided to ensure that the blender or chopper is secure within the orifice.

A plurality of removable spice holders 15 will be inserted into a corresponding plurality of openings on the lid to insert the spice holder 16 on the top surface. When the removable spice holder is not in use, a plug (not depicted) may be used to plug the openings for the removable spice holders.

Additionally, there will be an orifice 60 for storing the blender or chopper. When the blender or chopper is not used, there will be a cap for the orifice 55 which will also be provided. This will be inserted into the opening and a twist lock slot will be used to secure the blender or chopper.

The device will also have an inner shell 45 into which the food is provided. This inner pot is placed within the interior of the cooker 2 much like any pressure-cooking vessel. The inner pot will rest within another vessel which has an interlocking lip edge 3. This is to prevent the contents from spilling if the pressure cooker is ever tilted.

A power cord 40 will be inserted into the electrical connection port 35 to provide power.

While the embodiments of the invention have been disclosed, certain modifications may be made by those skilled in the art to modify the invention without departing from the spirit of the invention.

The inventor claims:

1. A programmable pressure-cooking vessel comprising:
    a vessel;
    said vessel is portable;
    an outer shell;
    a pair of handles;
    an inner shell;
    wherein the inner shell fits within the outer shell;
    a lid;
    wherein the lid is a predetermined shape;
    wherein the lid is placed over the outer shell;
    a twist lock;
    wherein the twist lock secures the lid to the vessel;
    a plurality of spice holders;
    wherein the plurality of spice holders are placed in openings on the lid of the vessel;
    wherein each of the plurality of spice holders stores a predetermined amount of ingredients;
    wherein the amount of the predetermined ingredients is determined by the user;
    a plurality of plugs;
    wherein the plurality of plugs are inserted into the openings for the plurality of spice holders when the spice holder is removed;

a blender;
wherein the blender is placed within an opening on the lid;
wherein a cap for the blender opening is provided;
wherein a blender twist lock slot is provided;
a digital control panel;
wherein the digital control panel is programmable;
a digital control panel on the lid;
wherein the digital control panel on the lid operates the opening of the plurality of spice holders;
a power source.

2. The programmable pressure-cooking vessel as described in claim 1 wherein the temperature is programmable.

3. The programmable pressure-cooking vessel as described in claim 1 wherein the addition of ingredients is programmable.

4. The programmable pressure-cooking vessel as described in claim 1 wherein the timing is programmable.

5. The programmable pressure-cooking vessel as described in claim 1 wherein the device can be programmed using wireless technology.

\* \* \* \* \*